UNITED STATES PATENT OFFICE.

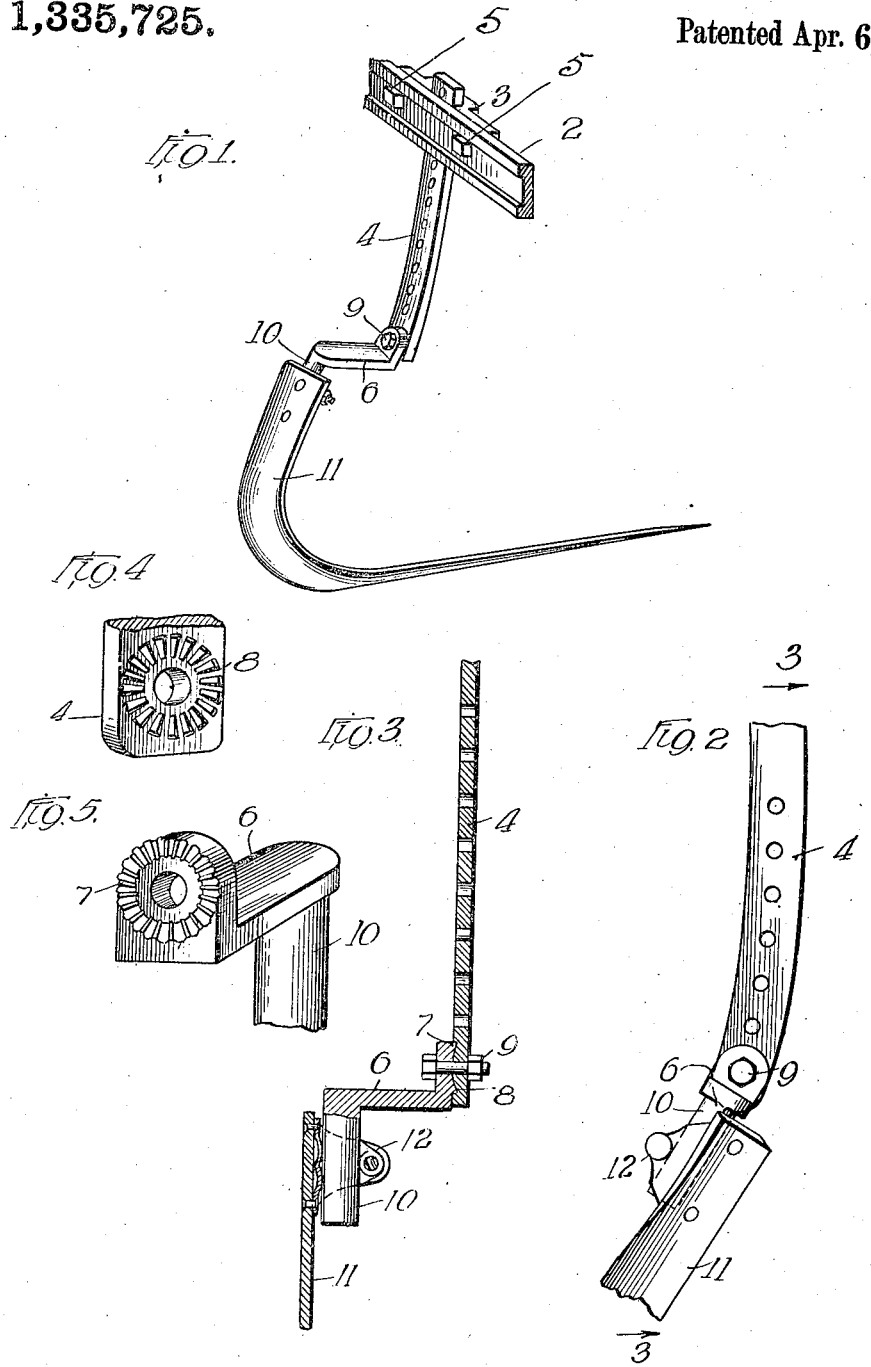

SAMUEL CLEMENS, OF HENNEPIN, ILLINOIS.

CULTIVATOR.

1,335,725.

Specification of Letters Patent.  Patented Apr. 6, 1920.

Application filed February 10, 1919. Serial No. 276,062.

*To all whom it may concern:*

Be it known that I, SAMUEL CLEMENS, a citizen of the United States, residing at Hennepin, in the county of Putnam and State of Illinois, have invented new and useful Improvements in Cultivators, of which the following is a specification.

This invention relates to cultivators.

The invention has special reference to means for attaching cutting blades to cultivator draft members, and is especially applicable for use in connection with cutting blades of the peculiar and special nature as those shown and described in my pending application for patent, Serial No. 146,735, filed February 5, 1917.

The object of my invention is to provide a connecting means between cultivator draft members and specially designed blade members which will facilitate several necessary adjustments in positioning said blades relative to said draft members.

A further object of the invention is to provide for laterally offsetting the blade member relative to shank members connected with the draft members.

Referring to the drawings:

Figure 1 is a perspective view showing my invention applied.

Fig. 2 is a side elevation of my invention.

Fig. 3 is a vertical sectional view of parts including my invention and showing particularly the means applied for connecting the different parts.

Fig. 4 is a perspective view of the lower end of a bar member provided with a clutch formation thereon.

Fig. 5 is a detail view of an offset member showing a clutch member thereon.

The invention shown in my earlier application Serial No. 146,752 is for a blade designed to skim or cut just beneath the surface of the ground, for the purpose of breaking crust formations and destroying small weed growth. The use of this particular character of blade as distinguished from an ordinary cultivator shovel requires special adjusting facilities relative to the cultivator draft members, and also requires an offsetting relative to the normal shovel carrying members of cultivators, and it is to meet these special requirements that I have designed the special connecting means between cultivator draft members and the blades.

Referring to the drawings, 2 is purposed to indicate a plow beam or draft member for a cultivator, 3 is a bracket on the beam and 4 is a curved bar or cultivator standard provided with plural longitudinally disposed perforations as shown, and is designed to be attached to the cultivator beam by entering the bracket 3, attached to said beam and to be secured in desired vertical adjustment by means of a bolt or bolts as 5. 6 is an angle arm, which I will hereinafter refer to as an offset member, that is designed to be attached to standard 4 at the side of the cultivator beams nearest the corn rows and to serve, through its connection with a cutting blade, to position said blade close to the corn row without shifting the cultivator beams to any great extent out of their natural trailing positions. The offset member 6 is fashioned with a clutch face as 7 which is designed to register with a similar clutch face 8 stamped or embossed upon standard 4 (see Figs. 4 and 5). Offset member 6 is connected to standard 4 by means of a bolt as 9 and thereby offset member 6 may be turned to occupy different positions and may be fixed relative to said standard 4. Offset member 6 is provided with a depending stem 10 purposed to provide for connection with the cultivator blade. The cultivator blade 11 is provided with clamp members as 12 which serve to engage stem 10 and provides for adjustment of the blade into different positions about the axis of said stem.

In practice a number of blades as 11 are designed to be used in connection with a cultivator, and to meet varying conditions of soil it is necessary to change the position thereof both with reference to points about the axis of stem 10 and also the inclination of the blade with relation to the surface of the ground. Sometimes the ground is wet and sometimes dry, and there are conditions between these extremes. The blade must either be inclined properly with reference to the surface of the ground, or disposed at proper angle with reference to the draft line or both relative positionings may become necessary to make the blade turn the soil properly or to insure that it will not clog and will always scour freely.

In applying my invention to practical use it will be borne in mind that the cutting blade with which it is designed to be connected is one wherein a cutting and deflecting part of the blade is designed to approach very closely to the corn hills, in fact very much closer than is possible in the use of ordinary shovels. Therefore the offset member 6 is of special importance as it enables the close approach of the upwardly extending part of the blade to run close to the corn row without abnormally deflecting the plow beams from their natural and normal position when used with ordinary cultivator shovels. Also the adjustability provided for both with reference to the connection of the offset member with the extensible bar standard 4 and that of the blade with the stem member 10 are peculiarly essential because of the particular and peculiar form of the blade and of the peculiar function it is designed to perform.

I have shown herein the form I prefer for applying my invention, however, the parts may be differently formed and differently arranged to gain the same result, but it is my desire herein to exemplify by structural parts the capability of offsetting a cutting blade member from a plow beam and providing connecting means that will facilitate adjustments of the cutting blade peculiarly necessary in the use of the same.

What I claim is:

1. In a cultivator, in combination, a plow beam, a standard related thereto in a vertically adjustable manner and provided with a clutch portion at its lower extremity, an offsetting member comprising a vertically disposed spindle portion for attachment of a cultivator blade and an offsetting reach portion at right angles thereto provided with a clutch member thereon adapted for adjustable engagement with the clutch member on the standard, whereby the offsetting member may be adjusted to incline the cultivator blade supporting spindle at different angles relative to the line of draft, and means for connecting the offsetting means to the standard in a manner to interlock the related clutch members.

2. In a cultivator, in combination, a plow beam, a standard provided with longitudinally disposed perforations in the upper portion thereof and with a clutch member formed upon the lower end thereof, means for fixing the standard to the plow beam, an offsetting member comprising a vertically disposed spindle portion for attachment of a cultivator blade and an offsetting reach portion at right angles thereto provided with a clutch member thereon adapted for engagement with the clutch member on the standard, whereby the offsetting member may be adjusted to incline the cultivator blade supporting spindle at different angles, and means for connecting the offsetting means to the standard in a manner to interlock the related clutch members.

SAMUEL CLEMENS.

Witnesses:
PETER B. ALLEMAN,
SIMON P. BECK.